United States Patent [19]

Womack

[11] Patent Number: 5,572,948
[45] Date of Patent: Nov. 12, 1996

[54] RATITE BIRD FEEDER

[76] Inventor: George E. Womack, 826 E. Main St., Gallatin, Tenn. 37066

[21] Appl. No.: 288,352

[22] Filed: Aug. 10, 1994

[51] Int. Cl.⁶ ................................................... A01K 39/00
[52] U.S. Cl. ............................................................. 119/53
[58] Field of Search ........................ 119/53, 53.5, 54, 119/52.1

[56] References Cited

U.S. PATENT DOCUMENTS

| D. 154,407 | 5/1949 | McCutcheon . | |
|---|---|---|---|
| 351,505 | 10/1886 | Fiske . | |
| 453,817 | 6/1891 | Mills . | |
| 902,682 | 11/1908 | Peterson . | |
| 1,380,564 | 6/1921 | Kennedy | 119/54 |
| 3,233,590 | 2/1966 | Venca | 119/53 |
| 3,763,826 | 10/1973 | Portelli . | |
| 4,303,039 | 12/1981 | Thibault | 119/52.1 |
| 5,230,301 | 7/1993 | Nass . | |
| 5,365,879 | 11/1994 | Ting-Kuan | 119/54 |

FOREIGN PATENT DOCUMENTS

| 2561867 | 10/1985 | France . | |
|---|---|---|---|
| 2630296 | 10/1989 | France | 119/54 |
| 810677 | 8/1951 | Germany . | |

Primary Examiner—Gene Mancene
Assistant Examiner—Thomas Price
Attorney, Agent, or Firm—Richard C. Litman

[57] ABSTRACT

A feeder specifically designed for feeding ratite birds from age two weeks to adulthood. The feeder has a cup providing the equivalent of a feeding trough. The cup has a perforated floor. This enables dust and fine particles which form when dry feed disintegrates over time to be separated from the remaining pellets. This is important, since ratite birds will refuse food excessively contaminated by this dust. The cup further prevents food pellets from being scattered during vigorous pecking while birds are feeding. The feeder includes a covered hopper for storing food. A sliding gate controls an opening leading to the cup. In another embodiment, the cup is adjustably mounted to the hopper below the feed opening. The cup is moved to cover and uncover the opening, thereby regulating the rate of discharge of feed into the cup. The hopper cover is frictionally closely fit to the hopper, thereby providing protection from rain. A removable rain hood further protects dispensed feed. The feeder is small enough to be readily mounted to any convenient environmental surface, and to be usable by ratite birds chicks. The surface of the feeder avoids graspable and moving parts, so as to discourage ostriches from manipulating and tampering with the feeder.

9 Claims, 3 Drawing Sheets

RATITE BIRD FEEDER

BACKGROUND OF THE INVENTION

1. Field of the Invention

The present invention relates to a bird feeder. The feeder is specifically designed to be suitable for feeding birds of the ratite variety.

2. Description of the Prior Art

Ratite birds are uniformly selective regarding the condition of pelletized food. Namely, they will ignore such food if it significantly comprises small particles arising from crumbling or disintegration of the pellets.

For health reasons, and to avoid waste, it is necessary to maintain the food dry. For economic reasons, it is generally desirable to minimize waste.

Ratite birds have characteristics requiring special accommodation for successful breeding. One characteristic is that the eggs are porous, and a fetus therewithin is easily killed by contamination from feces. Therefore, it is of the utmost importance to locate a feeder distant from a shelter.

Most animal species can have feeders located indoors, as in the animal's shelter, for protecting the feeder from rain. But because of the contamination problem, a ratite feeder is best located away from the shelter. This necessitates a separate shelter structure designed to discourage nesting.

For convenience and economic reasons, it is desirable to provide a feeder which functions without frequent attention. The answer to this situation in the prior art has generally been to make the feeder larger. A large feeder, however, will not serve small chicks. In the early days after hatching, ratite birds will exist from nutrients absorbed prior to hatching. They will then make the transition to eating dry food. It is inconvenient and wasteful to provide a plurality of sizes of feeders. Also, there is no assurance that adult birds will eat only from the largest feeder available.

Some ratite birds are curious and playful, and will potentially destructively play with environmental objects. It is the experience of the applicant that ostriches in particular can kick over feeding drums and have been known to open gates by manipulating the latches. It is very likely that they will grasp small projections from a feeder, especially if the projection moves relative to the body of the feeder. A ratite feeder must therefore be constructed to avoid delicate construction.

Prior art feeders are generally concerned with the mechanics of dispensing, and the specialized problems described above are not at issue in the field of general purpose feeders. Most feeders are simple storage devices which dispense feed responsive to gravity. They are usually arranged to be mounted on a vertical surface, or to depend from a fastener or support. Therefore, feeders usually include a hopper or similar storage receptacle, open at the top or covered, a constricted neck for dispensing food, and a trough holding dispensed food and making this food accessible to animals.

Ratites tend to peck vigorously at their food, which action scatters the food if not confined. Therefore, the relatively open prior art feeding troughs are disadvantageous with ratite birds.

The following references exemplify feeders, generally: U.S. Pat. No. 351,505, issued to Joseph W. Fiske on Oct. 26, 1886; U.S. Pat. No. 453,817, issued to Joseph S. Mills on Jun. 9, 1891; U.S. Pat. No. 902,682, issued to Andrew Peterson on Nov. 3, 1908; U.S. Pat. No. 3,763,826, issued to Sam Portelli on Oct. 9, 1973; U.S. Pat. No. 5,230,301, issued to Thomas O. Nass on Jul. 27, 1993; U.S. Pat. No. Design 154,407, issued to Freda C. McCutcheon on Jul. 5, 1949; French Pat. No. 2,561,867, dated Oct. 4, 1985; and German Pat. No. 810,677, dated Aug. 13, 1951.

The French reference discloses slidable doors enabling access to the feeding chamber. The German reference discloses a roof structure having overhang.

None of the above inventions and patents, taken either singly or in combination, is seen to describe the instant invention as claimed.

SUMMARY OF THE INVENTION

The present invention provides a suitable feeder for raising ratite birds. These birds can be quite large, and may be kept outdoors. The ideal ratite feeder will be portable, suitable for indoor and outdoor environments, and will separate food pellets from dust and small crumbs. The novel feeder further described hereinafter includes a feed holding receptacle having a perforated floor for enabling the dust and crumbs to be separated from the more substantial food pellets. A hazard of not separating the dust from more substantial pellets is that dust can build up and block further discharge of pellets to the feed holding receptacle. The feeding receptacle is preferably a cup, so that food pellets are constrained against scattering when the birds feed.

The feeder is designed to be small and portable. Size and weather protection render the feeder suitable for mounting at any convenient place in the breeding area, so that it need not be located within a shelter. Since the birds lay eggs in a sheltered area, the feeder is thus able to be located away from the birds' vulnerable eggs.

Since this location may be outdoors, even when the feeder is mounted on a vertical surface, it is important to provide protection from falling water, as from rain. A rain hood protecting three sides of the feeder has been found to be effective.

The small size further enables small chicks to feed. The same feeder is thereby usable for birds at any stage of life, except for the earliest days.

The novel feeder is constructed to avoid small projections and accessible moving parts. It is intended to be suspended from a supporting object, rather than to be free standing, since a free standing device would require a substantial or solidly anchored base to discourage being upset by ostriches.

Feed is available in different pellet sizes, subject to the manufacturer's practice. The novel feeder has an adjustable orifice for dispensing feed, so that this size difference can be accommodated.

Accordingly, it is a principal object of the invention to provide a feeder which is suitable for feeding ratite birds.

It is another object of the invention to separate food pellets from dust and fine particles contaminating the pellets, and make only uncontaminated pellets accessible to feeding animals.

It is a further object of the invention to provide a feeder which is small and portable.

Still another object of the invention is to protect the feed from the weather.

An additional object of the invention is eliminate moving parts and graspable projections from the exterior of the feeder.

It is again an object of the invention to make the feeder resistant to tampering by animals.

Yet another object of the invention is to adjust for different sizes of food pellets.

A still further object of the invention is to provide a removable rain hood sheltering exposed food.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
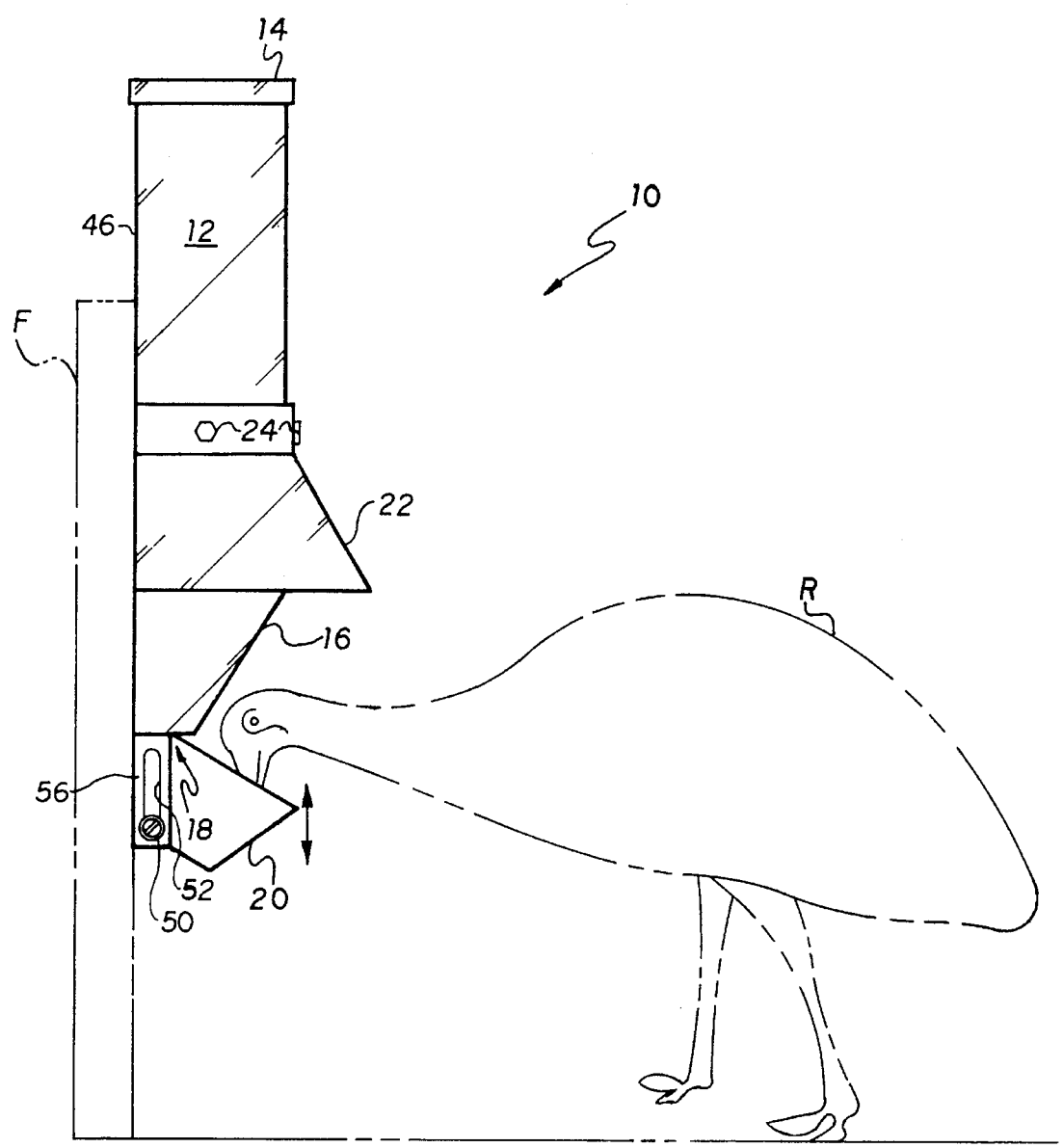
FIG. 1 is an environmental, side elevational view of the invention.

Turning now to FIG. 1 of the drawings, novel feeder 10 is seen vertically mounted to a vertical structure such as a fence post F. An adult ratite bird R can easily reach food (not shown) available in feeder 10, and chicks (not shown) could reach food if feeder 10 were mounted lower. Feeder 10 includes a receptacle 12 for storing food. Preferably, receptacle 12 has a flat or planar rear wall, for enabling mounting to a flat environmental surface, and therefore will have length and width. Regardless of the actual configuration, there will be at least one diametric dimension.

Receptacle 12 is open at the top 48. A removable cap 14 is provided to cover the open top 48.

A feed dispensing chute 16 is disposed at the bottom of receptacle 12. Chute 16 is tapered, and defines a dispensing opening 18 at its lower end. Opening 18 therefore has a diameter of lesser magnitude than that of receptacle 12.

Food in the form of pellets is discharged through chute 16 into a cup 20, for receiving food from chute 16 and maintaining the food available to animals. Cup 20 is slidably mounted on feeder 10 just below chute 16 by bolt 50 attached through bolt hole 54 to chute 16. Bolt 50 cooperates with vertical slot 52 on extensions 56 of cup 20 to provide for vertical adjustment of cup 20 with respect to opening 18 in the direction shown. Cup 20 progressively exposes opening 18 when moved downwardly, and obstructs opening 18 when raised. This arrangement enables cup 20 to function as a valve controlling the rate of food dispensation, dependent upon pellet size.

Cup 20 is preferably frustoconical. Steep lateral walls and minimal diameter provided by this configuration retain food pellets which might otherwise be widely scattered during vigorous pecking of the birds while feeding.

A removable rain hood 22 is provided for protecting food contained within cup 20 from falling water, as from rain, and other contaminants. Rain hood 22 is three sided, thus protecting all sides not protected by the structure to which feeder 10 is attached. Rain hood 22 is secured to feeder 10, as by bolts 24, for reasons which will be discussed further.

Figure 2:
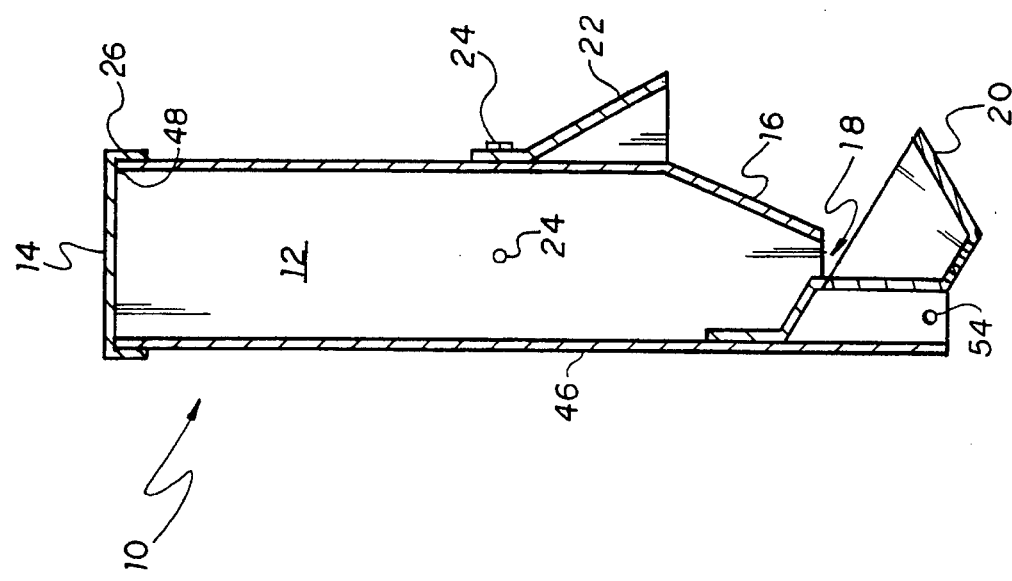
FIG. 2 is a side cross sectional view of the invention.

Turning now to FIG. 2, cap 14 is seen to include a peripheral, downwardly projecting wall 26 overlapping receptacle 12 by about one inch (2.5 cm). Cap 14 therefore provides a reasonable seal, excluding airborne water from contacting food, as well as providing a tight frictional grip on receptacle 12. This construction further avoids projections which might attract the attention of ostriches.

Figure 3:
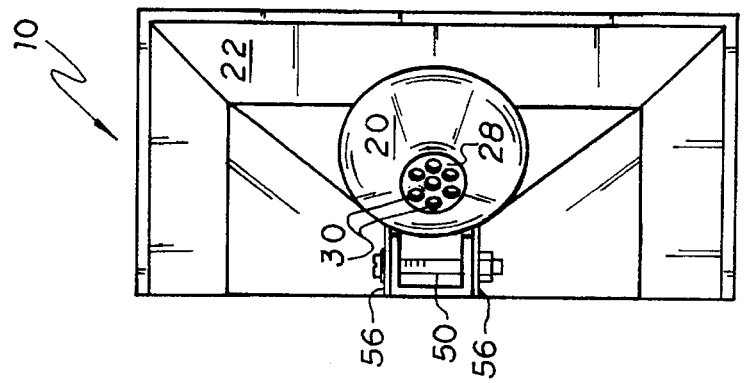
FIG. 3 is a bottom plan view of the invention.

FIG. 3 shows an important feature of cup 20. Floor 28 has holes 30 formed therein. Holes 30 enable fine particles of food which form when pellets crumble with age and handling to escape from cup 20, pellets being retained therein. Ratite birds will eat pellets and large pieces which may break therefrom, and continuous discharge replacing eaten food is thus assured.

Figure 4:
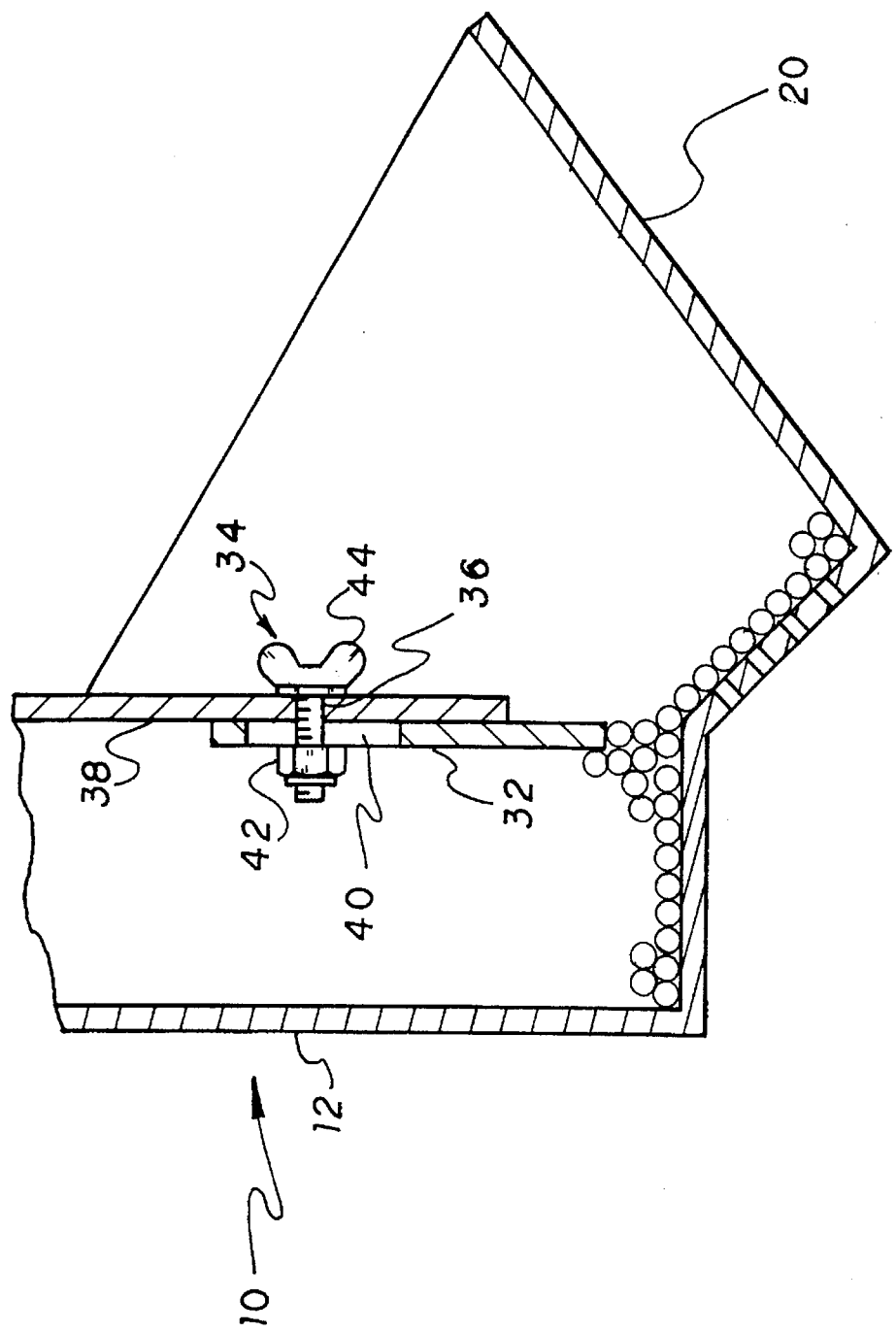
FIG. 4 is a side cross sectional detail view of an alternative embodiment of the pellet dispensing gate.

A preferred value arrangement for controlling the rate of feed of pellets is shown in FIG. 4. In this embodiment, a gate 32 is slidably secured to feeder 10 by a thumbscrew 34, and obstructs an opening communicating into cup 20. Thumbscrew 34 passes through a hole 36 formed in the wall 38 of cup 20, which wall 38 is common to both cup 20 and receptacle 12. A vertical slot 40 is formed in gate 32. Thumbscrew 34 includes a captive nut 42. When slackened, thumbscrew 34 releases gate 32 for appropriate vertical adjustment. Gate 32 is adjusted according to pellet size, greater pellet size requiring more opening of gate 32.

Thumbscrew 34 has a winged head 44 for grasping by a person adjusting the opening. Head 44 is advantageously located within cup 20 so that it is less visible to a curious ratite bird, and therefore less inviting to manipulation.

When properly adjusted, pellets will flow into cup 20, and cease to flow responsive to back up of exposed pellets. An equilibrium is achieved in that as the birds eat the pellets, additional pellets will flow into cup 20, and cease to flow as they accumulate in a small pile obstructing the opening at gate 32.

Examination of feeder 10, as depicted in the various Drawing Figures, will reveal that there are no projections from or parts thereof which are readily graspable by a ratite bird, and particularly, an ostrich. An ostrich has a curious nature, and will potentially manipulate and play with objects it can grasp in its beak. Bolting rain hood 22 will secure it against such tampering. Also, this is a significant reason for not having an external handle on cap 14. Furthermore, all construction details of feeder 10 purposefully avoid graspable projections of all types.

Graspable projections include objects susceptible to being grasped by the beak of a ratite bird. This generally excludes exposed planar members, such as the walls of cup 20, and rain hood 22, because although a ratite bird could partially surround these members with its beak, no firm hold can be developed thereby.

Examples of projecting structure which are susceptible to effective grasp by a ratite bird's beak are seen in some of the above references. A knob type handle is shown on the food storage receptacle cover of Fiske. If designed to include dimensions usable to most people for grasping by hand, the knob would likely also be graspable by an adult ostrich. Mills provides a loop type handle. The German reference shows an exposed wire supporting a bird perch platform. While the presence of such structure is not objectionable in most cases, it invites potentially damaging manipulation in the present case.

It is to be understood that the present invention is not limited to the sole embodiment described above, but encompasses any and all embodiments within the scope of the following claims.

I claim:

1. A feeder for ratite birds, comprising:

a receptacle for storing food having an open top;

a removable cap covering said open top, said removable cap having a downwardly projecting peripheral wall which grips said receptacle by friction;

a tapered feed dispensing chute disposed below said receptacle, said feed dispensing chute having a dispensing opening;

a valve disposed in said dispensing opening for controlling the rate of food dispensation, said valve including a gate movably attached to said chute by a threaded fastener; and a food receiving cup disposed in communication with said dispensing opening, said cup including a floor having a plurality of holes therein, for enabling escape of fine particles of food, while retaining food pellets in said cup.

2. The feeder according to claim 1, further including a removable rain hood disposed thereon, located above said cup, thus protecting said cup from falling water.

3. The feeder according to claim 2, said rain hood projecting radially from and protecting three sides of said feeder.

4. The feeder according to claim 1, further having an unobstructed external surface devoid of graspable projections and movable parts.

5. The feeder according to claim 1, said threaded fastener having a winged head accessible from inside said cup to a person adjusting said dispensing opening.

6. A feeder for ratite birds, comprising:

a receptacle for storing food, having an open top, a flat rear wall for mounting to a flat environmental surface;

a removable cap covering said open top, said removable cap having a downwardly projecting peripheral wall which grips said receptacle by friction, thereby preventing falling water from entering said receptacle, said removable cap dimensioned and configured to fit snugly to and on said receptacle;

a tapered feed dispensing chute disposed below said receptacle, said feed dispensing chute having a dispensing opening;

a valve controlling the rate of discharge of food dispensation through said dispensing opening, further including a gate slidably mounted across said dispensing opening, said gate selectively and progressively exposing and obstructing said dispensing opening, whereby vertical adjustment of said gate controls the rate of food dispensation;

a cup disposed opposite said rear wall, said cup having a floor having a plurality of holes therein, for enabling escape of fine particles of food, while retaining food pellets in said cup, said cup disposed in communication with said dispensing opening;

a removable rain hood located above said cup, projecting radially outwardly from said receptacle, for protecting said cup from falling water; and an unobstructed external surface devoid of graspable projections and movable parts.

7. The feeder according to claim 6, said rain hood projecting from three sides of said receptacle.

8. the feeder according to claim 6, said valve further comprising a threaded fastener attachable to said feeder and securing said gate at a selected position with respect to said opening, said threaded fastener having a winged head accessible from inside said cup.

9. A feeder for ratite birds, comprising:

a receptacle for storing food, having an open top and a flat rear wall for mounting to a flat environmental surface;

a removable cap covering said open top, said removable cap having a downwardly projecting peripheral wall which grips said receptacle by friction, thereby preventing falling water from entering said receptacle, said removable cap dimensioned and configured to fit snugly to and on said receptacle;

a tapered feed dispensing chute disposed below said receptacle, said feed dispensing chute having a dispensing opening;

a valve controlling the rate of discharge of food dispensation, said valve including a gate vertically adjustable with respect to said dispensing opening, and a threaded fastener attaching said gate to said feeder, said threaded fastener having a winged head accessible to a person adjusting said dispensing opening, said gate selectively and progressively exposing and obstructing said dispensing opening, whereby vertical adjustment of said gate controls the rate of food dispensation;

a cup disposed opposite said rear wall, said cup having a floor having a plurality of holes therein, for enabling escape of fine particles of food, while retaining food pellets in said cup;

a removable rain hood located above said cup, bolted to said receptacle and projecting radially outwardly from three sides of said receptacle, for protecting said cup from falling water; and an unobstructed external surface devoid of graspable projections and movable parts.

* * * * *